United States Patent [19]

Ohmura

[11] 4,187,633
[45] Feb. 12, 1980

[54] REEL SEAT FOR FISHING RODS
[75] Inventor: Ryuichi Ohmura, Shizuoka, Japan
[73] Assignee: Fuji Kogyo Co., Ltd., Japan
[21] Appl. No.: 875,923
[22] Filed: Feb. 7, 1978
[51] Int. Cl.² .................................................. A01K 87/06
[52] U.S. Cl. .................................................. 43/22
[58] Field of Search .................. 43/22; 156/252, 172, 156/169, 91, 290; 428/138; 228/165

[56] References Cited
U.S. PATENT DOCUMENTS

| | | | |
|---|---|---|---|
| 1,293,871 | 2/1919 | Murray | 228/165 |
| 2,612,714 | 10/1952 | Coleman | 43/22 |
| 2,679,468 | 5/1954 | Pitman | 428/138 X |

FOREIGN PATENT DOCUMENTS 1133203 3/1957 France ........................ 43/22

*Primary Examiner*—Robert C. Watson
*Attorney, Agent, or Firm*—Holman & Stern

[57] ABSTRACT

A reel seat for a fishing rod in which multiple perforations are provided in a foot of the reel seat prevents generation of frictional sound caused by incomplete adhesion of the foot to the fishing rod.

1 Claim, 2 Drawing Figures

REEL SEAT FOR FISHING RODS

BACKGROUND OF THE INVENTION

A conventional reel seat has been so far fixed to a fishing rod by placing a foot protruding from both ends of the seat on the rod, winding fine thread about the rod to clamp the foot on the rod and applying plastic coating such as synthetic varnish over the winding. This foot is, however, liable to slide on the surface of the rod while the rod is in action, and often generates frictional sound so that false fish-strike signals are transmitted to a fisherman's hand.

SUMMARY OF THE INVENTION

The present invention relates to a reel seat for a fishing rod. More particularly, it relates to a reel seat free from the aforesaid defects.

Numerous holes are perforated in the foot of a reel seat which assists penetration of varnish to the surface of a rod.

BRIEF DESCRIPTION OF THE DRAWINGS

A preferred embodiment of the present invention is concretely described in the following detailed description, which may be best understood when read in connection with the accompanying drawings in which.

DETAILED DESCRIPTION OF THE INVENTION

Figure 1:
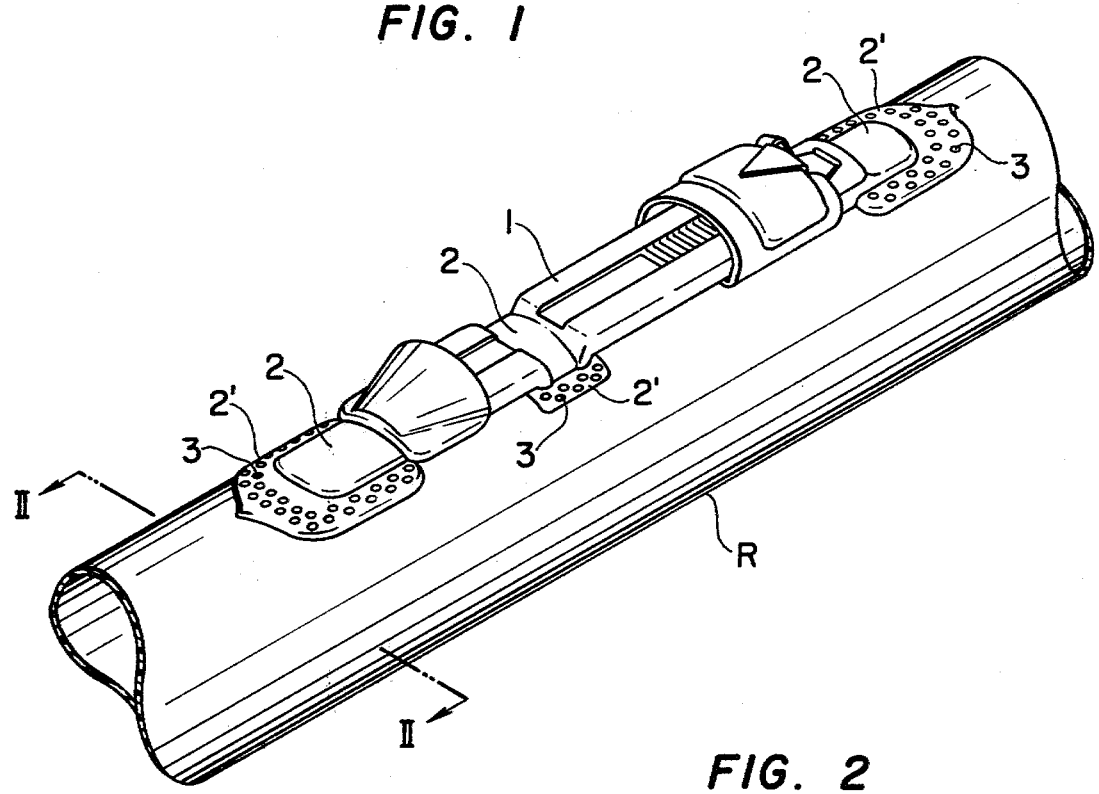
FIG. 1 is perspective view illustrating a preferred embodiment of the present invention.
Figure 2:
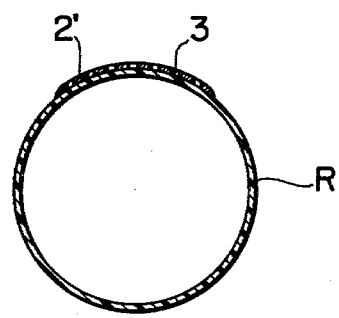
FIG. 2 is a sectional view showing the foot mounted on a rod.

Referring now to the drawings, feet 2' each having numerous holes 3 perforated therein, and being formed of a separate thin metal sheet, are bonded to the right and left ends 2 and the central foot portion 2 of a reel seat 1 by electric welding. Multiple holes may be bored directly in the foot 2. However, this technique is disadvantageous in the case of a thick foot.

In order to secure this reel seat to a fishing rod R, the reel seat 1 is firstly placed on the rod, and the foot 2' is fixed by winding fine thread about the rod to clamp the foot on the rod. Plastic coating is then applied over the winding. The applied plastic coating reaches the surface of the rod through the winding and the holes 3. The holes 3 are filled by the plastic coating in this way; hence, the bonding power increases remarkedly.

Another feature of the present invention is to make a considerable reduction in a setting time due to the ventilative effect; this being rendered possible through the use of a volatile type of coating. Further, the multiple holes formed in the foot 2' has an effect on making it easy to fit the foot onto the periphery of a fishing rod since they decrease rigidity of the foot.

While one embodiment of the present invention has been shown in the foregoing specification, it will, of course, be understood that various modifications and changes may be made therein without departing from the invention. It is, therefore, intended that the following claims cover all such modifications and changes as may fall within the spirit and scope of the present invention.

What is claimed is:

1. A reel seat for fishing rods having a foot protruding from each end thereof, wherein each foot has multiple holes perforated therein, is made thinner than the reel seat, and is formed of a separate piece of metal.

* * * * *